United States Patent [19]
Armstrong

[11] 3,829,650
[45] Aug. 13, 1974

[54] APPARATUS FOR INDUCTIVELY HEATING TUBULAR METAL WORKPIECES

[76] Inventor: Robert G. Armstrong, c/o Park-Ohio Industries Inc., 3800 Harvard Ave., Chardon, Ohio 44105

[22] Filed: Dec. 12, 1973

[21] Appl. No.: 423,978

[52] U.S. Cl............ 219/10.69, 198/24, 219/10.57, 219/10.73
[51] Int. Cl. ........................................... H05b 5/08
[58] Field of Search.......... 219/10.69, 10.67, 10.57, 219/10.73; 198/24; 266/5 EI

[56] References Cited
UNITED STATES PATENTS
| | | | |
|---|---|---|---|
| 2,907,858 | 10/1959 | Distler | 219/10.69 |
| 3,005,894 | 10/1961 | Caabo et al. | 219/10.69 |
| 3,748,425 | 7/1973 | Potter | 219/10.69 |

Primary Examiner—Bruce A. Reynolds
Attorney, Agent, or Firm—Meyer, Tilberry, & Body

[57] ABSTRACT

Apparatus is provided for inductively heating and hardening cartridge casings including a conveyor rotatable step-by-step past a casing input station, through an induction heating tunnel and to an output station from which the casings are discharged into a quenching bath. The conveyor is provided with a plurality of cartridge casing receiving openings, and the casings extend through the openings for the lower ends thereof to engage a support surface and slide therealong during movement of the conveyor from the input station through the heating tunnel. The supporting surface terminates prior to the output station. Reciprocating plungers having a common operator are axially aligned with corresponding openings at the input and output stations and are actuated during each dwell of the conveyor to positively displace a casing into a conveyor opening at the input station and to assist the displacement of a heated casing from the conveyor at the output station.

16 Claims, 5 Drawing Figures

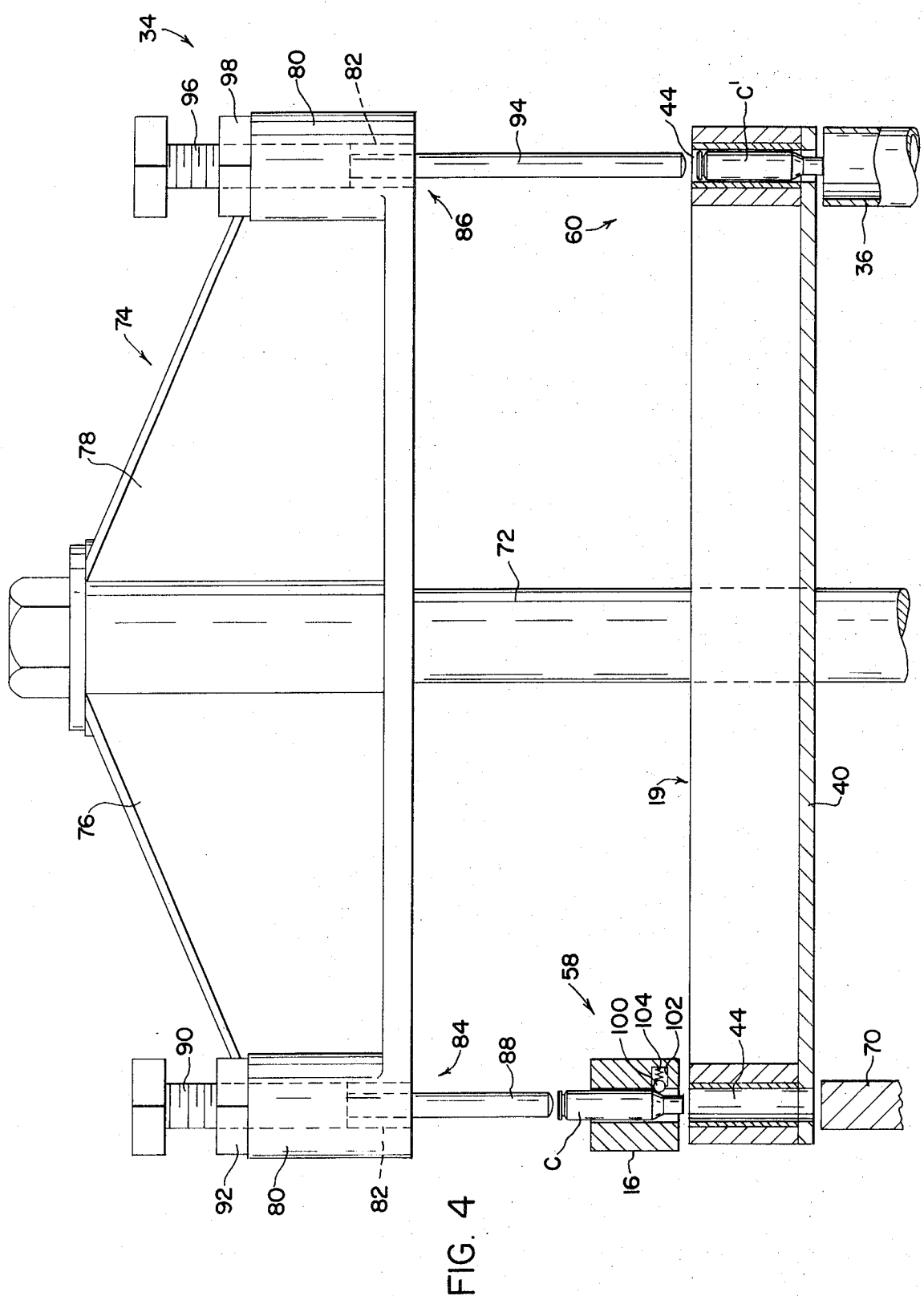

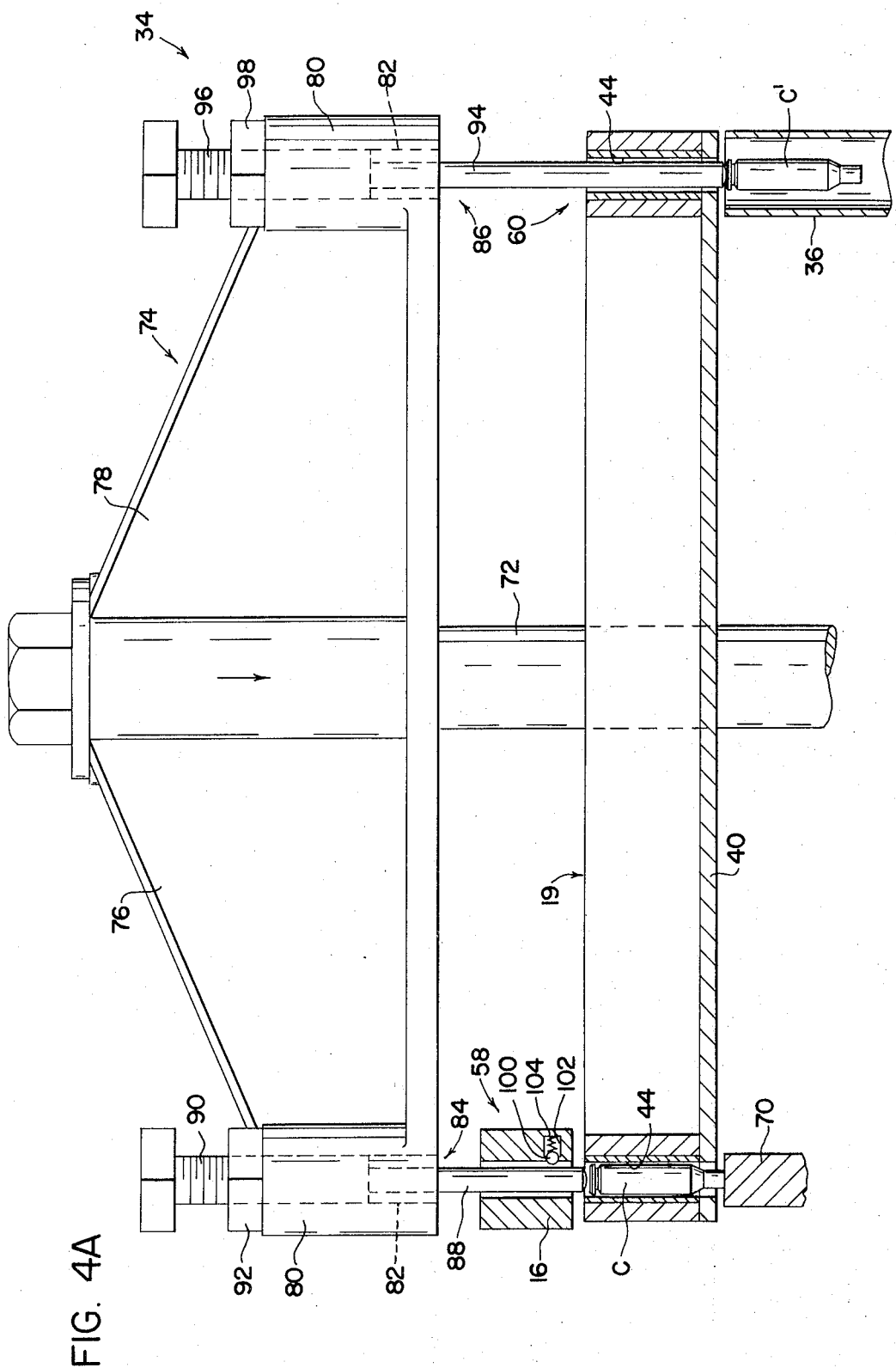

APPARATUS FOR INDUCTIVELY HEATING TUBULAR METAL WORKPIECES

The present invention relates to the art of induction heating and, more particularly, to apparatus for feeding, progressively heating and discharging metal workpieces.

The apparatus of the present invention finds particular utility in conjunction with the hardening of tubular metal cartridge casings and, accordingly, will be described herein with respect thereto. It will be readily apparent from the description, however, that the apparatus can be employed to inductively heat and/or harden workpieces other than cartridge cases such as, for example, open ended tubular workpieces or solid workpieces, and workpieces having cross sections other than circular.

In conjunction with the handling of metal cartridge casings for hardening, annealing or other treating operations, production rate is of utmost importance, as is the achieving of the treating operation with minimum damage to the casings, such as by dents, scratches and the like. In a heat treating operation, for example, the cartridge casings are often fed into workpiece receiving openings in a conveyor rotatable step-by-step so as to index the casings progressively from an input station through a heating station in which the casings are heated to a desired temperature and then to an output station from which the heated casings are discharged into a quenching bath. In apparatus for this purpose, a casing to be hardened is introduced into a conveyor receiving opening at the input station during a dwell in conveyor movement and, at the same time, a heated casing is discharged from the conveyor at the output station. The conveyor then indexes one step and the feeding and discharge operations are repeated. Each casing introduced into a conveyor opening at the input station is advanced step-by-step toward the output station and through a heating station between the input and output stations. The heating station has a length along the path of movement of the casings between the input and output stations which is sufficient for each casing to be heated to a desired temperature as it progresses step-by-step through the heating station in magnetically coupled relationship with respect to an inductor extending the length of the heating station.

The production rate which can be achieved, in acceptable parts per hour for example, is dependent upon the rate at which the conveyor can be indexed continuously without interruption and/or without damage to the casings during the input and discharge operations.

In this respect, indexing of the conveyor must provide for a dwell of sufficient time to assure entry of a casing into a conveyor opening at the input station and clearance from the conveyor of a casing discharged at the output station. If the conveyor dwell is not sufficient, one or the other or both of the casings at the input and output stations may not be fully seated in the opening or displaced therefrom, respectively, when stepping of the conveyor commences. Thus, the succeeding movement of the conveyor may be impeded causing jamming, or the casing or casings may be damaged by contact with the conveyor or an adjacent component of the apparatus. It will be appreciated, therefore, that the dwell time directly affects the production rate.

Cartridge casing treating apparatus of the foregoing character has been provided heretofore. For example, U.S. Pat. No. 2,907,858 to Distler discloses a cartridge casing treating system in which a plurality of casings are simultaneously introduced into a corresponding number of conveyor openings at an input station and a corresponding number of heated casings are simultaneously discharged at the output station. In the system disclosed in the foregoing patent, casings to be introduced onto the conveyor are disposed in bores of a feed device and air under pressure is employed to assist movement of the casings from the feeding device into the conveyor openings. At the discharge station, a retractable plate positioned beneath a number of openings is displaced from beneath the openings during conveyor dwell so that the heated casings in the pocket fall therefrom by gravity.

The feeding and discharge arrangements disclosed in the patent to Distler have disadvantages attendant both to production rate and the possibility of apparatus jamming and/or casing damage. Moreover, the apparatus is structurally complex and accordingly is undesirably expensive to manufacture and maintain. More particularly with regard to the foregoing disadvantages, the use of forced air for feeding casings into the conveyor pockets necessarily requires complex and expensive sealing and valving arrangements to control air flow. Further, the introduction of air into the bore of a feeding device in which a casing is disposed can cause vibration of the casing laterally of the bore during its movement therefrom into the conveyor opening. While such vibration is not likely to damage the casing, it can impede movement of the casing from the bore and thus increase transfer time which must be compensated for by increasing the period of dwell of the conveyor to be sure that the casing completely clears the feed device before the conveyor begins the subsequent stepping movement. Otherwise, jamming and/or casing damage can result.

With regard to the gravity discharge and retractable plate arrangement, the cammed retractable support plates beneath the casing pockets in the conveyor is a structurally complex arrangement adding to the cost and maintenance of the apparatus. More importantly, reliance on gravity alone to achieve discharge of the casings from the conveyor openings upon withdrawal of the plates undesirably increases the dwell time of the conveyor required to assure clearance of the casings from the openings prior to advancement of the conveyor. In this respect, it will be appreciated that at the instant of withdrawal of the support plate the casings are in a static state with regard to the conveyor openings. The light weight casings must then accelerate under the influence of gravity alone in their movement from the openings. Movement in this respect is slow. Moreover, a casing may in certain instances vibrate laterally against the wall of the opening, thus decreasing its rate of movement out of the opening. Again, the dwell time of the conveyor must be sufficient to assure clearance of the casings from the openings prior to advancement of the conveyor, and the extended dwell required by movement of the casings under the influence of gravity alone reduces the rate of indexing and accordingly, the rate of production.

In accordance with the present invention, apparatus is provided which is of the general character discussed hereinabove and by which the indexing rate of the conveyor is maximized to increase production rate and eliminate stoppage by jamming and rejection of parts by damage resulting from failure of a part to completely clear the feeding device or conveyor openings at the output station. More particularly, the apparatus in accordance with the present invention provides a positive mechanical feed of parts into conveyor openings during conveyor dwell and positive mechanical assistance in the discharge of parts from the conveyor openings at the output station. Still further, the mechanical components whereby positive feed and assisted discharge are achieved are operated simultaneously during conveyor dwell and are mechanically coordinated with conveyor indexing movement to preclude any interference between casings and apparatus during the feed and discharge operations and during subsequent stepping movement of the conveyor. The positive feed and assisted discharge minimizes and equalizes the time required to achieve the feed and discharge functions, whereby the indexing rate can be increased to increase production rate.

Accordingly, it is an outstanding object of the present invention to provide improved apparatus for feeding, progressively heating and discharging metal workpieces in an induction heat treating system.

Another object is the provision of improved apparatus of the foregoing character which minimizes stoppage and/or workpiece damage as a result of interference between workpieces and apparatus following feeding and/or discharging operations.

Yet another object is the provision of improved apparatus of the foregoing character by which an increased production rate is realized by minimizing dwell time and coordinating workpiece feed and discharge operations with conveyor dwell, thus to minimize rejection of workpieces and stoppage of production by part jamming.

A further object is the provision of improved apparatus of the foregoing character in which workpiece input to the conveyor and workpiece discharge from the conveyor are simultaneous and positive, thus minimizing dwell time required to assure workpiece clearance with respect to a feed device at the input station and with respect to the conveyor at the output station.

Still a further object is the provision of an improved apparatus of the foregoing character in which a workpiece is mechanically displaced onto the conveyor simultaneously with respect to mechanically assisted discharge of a workpiece from the conveyor.

Another object is the provision of improved apparatus of the foregoing character which is of relatively simple structure and comprised of a minimum number of component parts whereby the apparatus is economical both from the standpoint of production, operation and maintenance.

The foregoing objects, and others, will in part be obvious and in part pointed out more fully hereinafter in conjunction with the written description of a preferred embodiment of the invention illustrated in the accompanying drawings in which:

FIG. 4 is a sectional elevation along line 4—4 in FIG. 2 and showing the mechanical feed and discharge assisting components in one of the positions of operation thereof; and, FIG. 4A is a sectional elevational view corresponding to that of FIG. 4 and illustrating the mechanical feed and discharge assisting components in another of the operating positions thereof.

Figure 1:
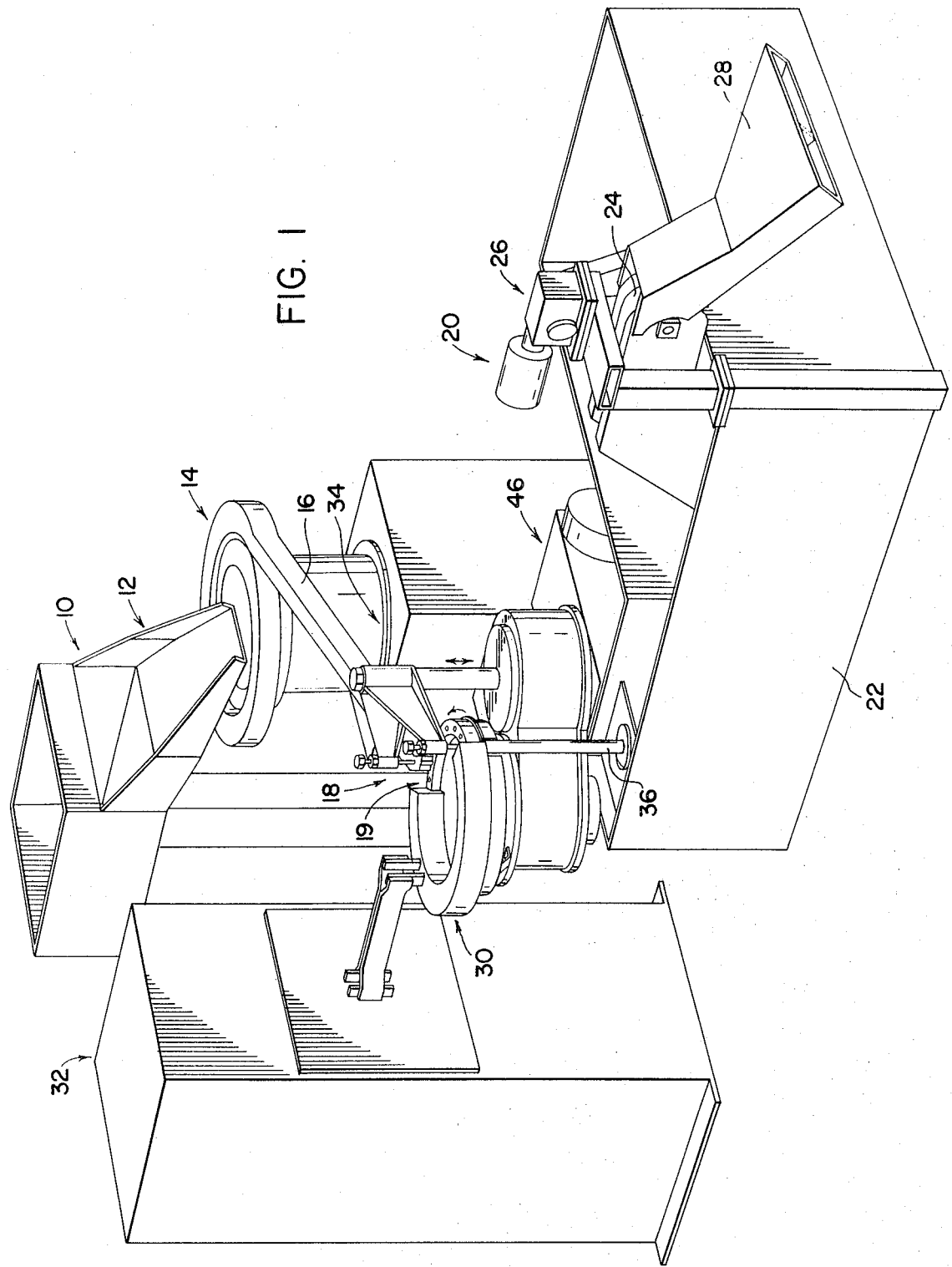
FIG. 1 is a perspective view of apparatus for quench hardening cartridge casings in accordance with the present invention.

Referring now in greater detail to the drawings wherein the showings are for the purpose of illustrating a preferred embodiment of the invention only and not for the purpose of limiting the invention, a cartridge casing heat treating system is illustrated in FIG. 1. The system includes a storage bin 10 for a cartridge casings to be treated and having an output chute 12 for the gravity feeding of cartridge casings to a vibratory orienting and feeding device 14 having an output or feed chute 16. As is well known, device 14 is operable to convey workpieces introduced thereinto to feed chute 16 such that the workpieces are each oriented in a predetermined relationship with respect to a reference axis or the like. In the embodiment disclosed, the cartridge casings are oriented such that the axes thereof are generally vertical and the closed end of the casing is at the top thereof.

The heat treating system further includes a workpiece feeding, conveying, heating and discharging assembly 18 to be described more fully hereinafter and by which cartridge casings are introduced onto a conveyor 19, progressively heated and then discharged into a quenching tank assembly 20 for hardening the heated casings. The quenching tank assembly includes a receptacle 22 for a suitable solution for quench hardening the heated workpieces by submersion of the workpieces therein. In the embodiment illustrated, the quenching assembly further includes an endless conveyor belt 24 driven by a suitable motor and transmission device 26 to convey the quenched casings to a discharge chute 28 leading from receptacle 22. During the heat treating operation, the casings to be hardened are indexed through a tunnel-like heating unit 30 including an inductor having its opposite ends connected across a suitable source of alternating current. In the embodiment shown, the power source unit is designated generally by the numeral 32, and it will be appreciated that any suitable power supply arrangement can be employed to energize the inductor.

As will become more apparent hereinafter, a cartridge casing is held in position at the lower end of feed chute 16 in overlying relationship with respect to a casing receiving opening in conveyor 19 and is displaced from the feed chute into the opening by reciprocating movement of a feed and discharge plunger mechanism 34. The latter mechanism operates simultaneously to feed a workpiece onto the conveyor and to discharge a heated workpiece into a guide tube 36 which guides the heated workpiece into quenching tank 22. Conveyor 19 is indexed step-by-step and during each dwell thereof the feed and discharge plunger mechanism operates in the foregoing manner. Accordingly, it will be appreciated that a cartridge casing is introduced onto conveyor 19, progressively advanced through heating unit 30, discharged into quench tank 22 for hardening, and then conveyed from the quench tank to discharge chute 28.

Figure 2:
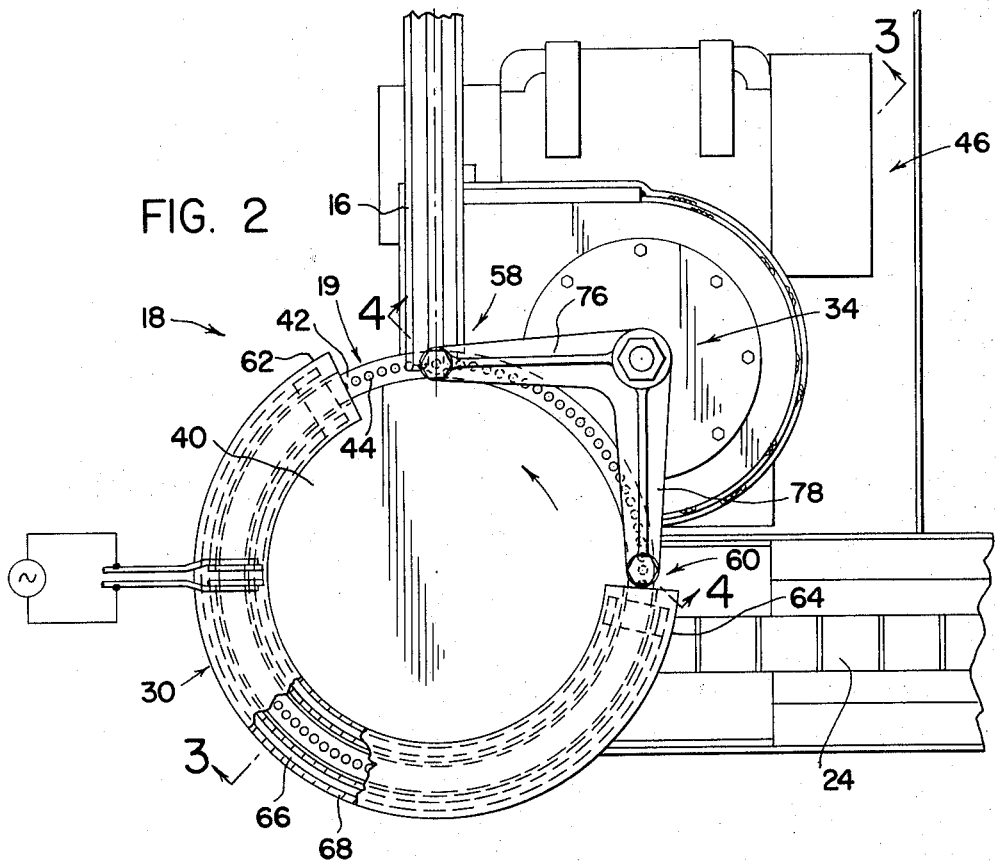
FIG. 2 is a plan view of the workpiece indexing conveyor of the system illustrated in FIG. 1 and showing the workpiece input, heating and output stations relative to which the conveyor moves.
Figure 3:
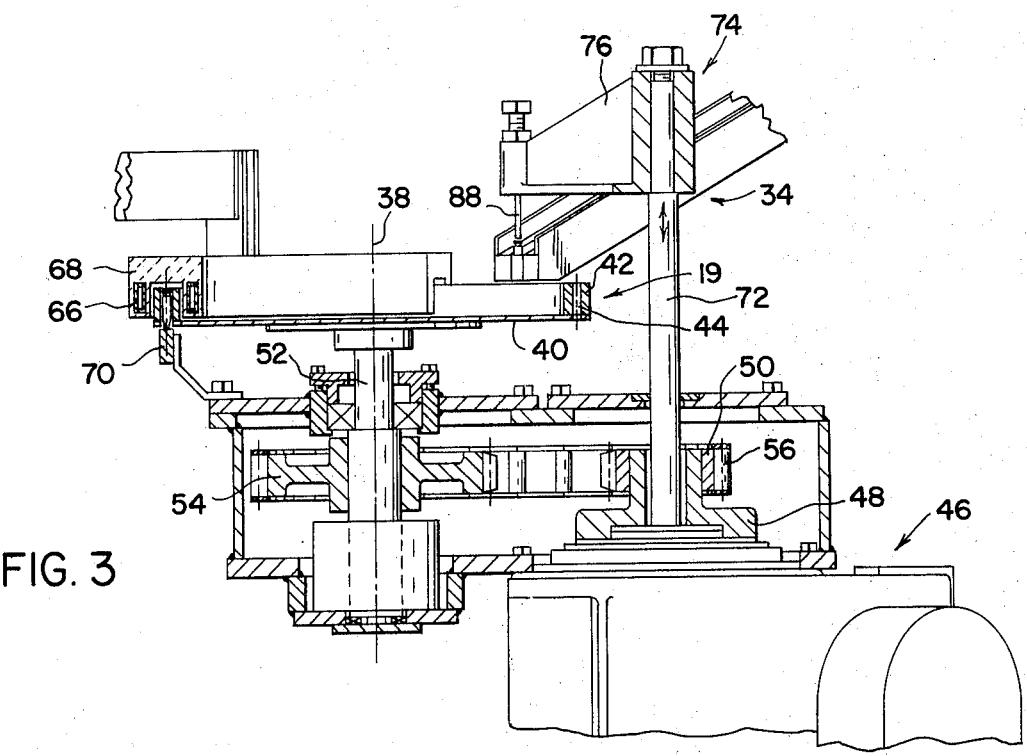
FIG. 3 is a sectional elevation view of the conveyor illustrated in FIG. 2, the section being along line 3—3 in FIG. 2.

Referring now to FIGS. 2 and 3 of the drawing, it will be seen that feeding, conveying, heating and discharging assembly 18 is comprised of conveyor 19 which is adapted to be rotated step-by-step about a vertical axis 38. Conveyor 19 includes a circular disc or base plate 40 having an upstanding peripherally continuous cartridge receiver 42 of suitable non-magnetic material mounted thereon. Receiver 42 and plate 40 are provided with aligned openings extending therethrough which define cartridge casing receiving openings 44 extending through the conveyor. A plurality of the cartridge casing receiving openings are provided about the periphery of the conveyor in equally spaced apart relationship, and the openings are circular and have axes parallel to conveyor axis 38. Openings 44 are circumferentially spaced apart a distance corresponding to one step of movement of the conveyor.

Base plate 40 is adapted to be rotated step-by-step through a drive and transmission mechanism 46. Mechanism 46 can be any suitable and well known mechanism by which intermittent rotation is imparted to an output component 48. In the embodiment illustrated, the drive and transmission mechanism rotates output component 48 through a given number of steps per revolution thereof. However, it is desired to provide conveyor 19 with twice as many cartridge casing receiving openings as the given number of indexing steps of output member 48. Moreover, it is desired that each indexing step of conveyor 19 correspond to the distance between adjacent cartridge casing receiving openings. Accordingly, conveyor 19 is drivingly interconnected with output member 48 to achieve one cycle of rotation of the conveyor for two cycles of rotation of output member 48. In this respect, output member 48 is provided with a gear 50, and support shaft 52 on which conveyor support plate 40 is mounted is provided with a gear 54. The gear ratio between gears 54 and 50 is 2:1, and the gears are drivingly interengaged by a suitable endless chain or belt 56. It will be appreciated that other drive arrangements can be employed to achieve the desired stepping action with respect to given design and operation requirements.

An input station 58 and an output station 60 are spaced apart circumferentially with respect to conveyor 19 for the cartridge casing receiving openings to pass these stations during rotation of the conveyor. Heating unit 30 defines a heating station with respect to the conveyor which has a circumferential extent sufficient to assure heating of the cartridge casings to a desired temperature during stepped movement thereof through the heating station from inlet end 62 thereof to outlet end 64. Any suitable inductor structure can be employed to achieve heating of the cartridge casings and, in the embodiment illustrated, the inductor includes a tubular conductor 66 of electrically conductive material, such as copper, having legs disposed on radially opposite sides of cartridge casing receiver 42 and encased in a suitable insulating ceramic material 68 having a U-shaped configuration in cross section. The latter configuration provides for the heating station to be in the form of a circumferentially elongated tunnel through which the cartridge casings are moved and in which the cartridge casings are in magnetically coupled relationship with conductor 66 to achieve induction heating of the casings.

As pointed out hereinabove, cartridge casing receiving openings 44 in the conveyor extend completely therethrough. Accordingly, a circumferentially extending casing support rail 70 is supported beneath the openings and in radial alignment therewith so that the lower ends of the cartridge casings engage and slide along the rail during stepped movement of the conveyor. With respect to the direction of movement of the conveyor, which is counterclockwise as viewed in FIG. 2, support rail 70 extends circumferentially from input station 58 at least to output station 60. The support rail could be a continuous ring supported beneath the conveyor, but it will be appreciated that the ring would have to be apertured or otherwise interrupted in continuity to enable a cartridge to be discharged from the conveyor at the output station. Preferably, rail 70 begins at a location underlying a casing fed onto conveyor 19 at the input station and terminates at a location just proceeding the position of a conveyor opening 44 disposed at the output station. In any event, the support rail provides a continuous support surface between input station 58 and output station 60 to support the cartridge casings for sliding movement between these points. Further, it will be appreciated that rail 70 can be vertically positioned relative to support plate 40 to achieve the desired axial positioning of the cartridge casings within the inductor. In this respect, as illustrated in FIG. 3, rail 70 is spaced below conveyor plate 40 to provide for the lower, necked-in end of the cartridge casing to be more loosely coupled magnetically with the inductor than the remaining portion of the casing, whereby the lower end is heated to a lesser degree than the remainder of the casing.

Referring now to FIGS. 4 and 4A in conjunction with FIGS. 2 and 3, each time conveyor 19 dwells during rotation thereof one of the openings 44 in the conveyor is positioned at input station 58 and another of the openings is positioned at output station 60. Further, during each dwell a cartridge casing is introduced into the opening at input station 58 and the heated cartridge in the opening at output station 60 is discharged therefrom into guide tube 36 leading to the quenching bath. In accordance with the present invention, the cartridge casing at input station 58 is positively and mechanically fed into the corresponding opening in the conveyor and, simultaneously therewith, the cartridge in the opening at the output station is discharged with mechanical assistance. The feed and discharge operation is achieved through feed and discharge plunger mechanism 34.

More particularly, with reference to FIGS. 4 and 4A, reciprocable feed and discharge plunger mechanism 34 includes a shaft 72 which, in the embodiment illustrated, is an auxiliary shaft reciprocated by the indexing drive and transmission mechanism 46. Output member 48 rotates relative to shaft 72, and the reciprocating movement of shaft 72 is coordinated with the intermittent rotation of output member 48 in a manner whereby shaft 72 reciprocates downwardly and then upwardly during each dwell in the rotation of output member 48. It will be appreciated, therefore, that conveyor 19 moves one step and stops, shaft 72 descends and rises, and the conveyor then moves another step. The manner in which reciprocating movement of auxiliary shaft 72 is achieved in coordination with indexing movement of the conveyor is well known in the indexing conveyor art and does not form a part of the present invention. Accordingly, the structural details of the drive mechanism by which this function is achieved are not shown. Moreover, as will become more apparent hereinafter, the function of reciprocating shaft 72 can be achieved by a reciprocating shaft separate from the conveyor drive mechanism.

Shaft 72 is provided on its upper end with a rigid arm 74 having portions 76 and 78 extending radially from the axis of the shaft and at an angle with respect to one another for the radial outer ends of the arm portions to overlie input station 58 and output station 60, respectively. It will be appreciated that the angle between arm portions 76 and 78 and the radial extent thereof with respect to the axis of shaft 72 will vary depending on the locations of the input and output stations relative to one another and with respect to the axis of shaft 72. The outer ends of arm portions 76 and 78 each terminate in a similar hub 80. Each hub is provided with a threaded bore 82 having an axis parallel to the axis of shaft 72. An input plunger component 84 is mounted in the bore of the hub on arm portion 76, and a discharge plunger component 86 is mounted in the bore of the hub of arm portion 78. Plunger component 84 includes a plunger shank 88 integral with or otherwise attached to a threaded mounting shank 90 adapted to threadedly engage bore 82. The latter threaded engagement enables axial adjustment of plunger shank 88 relative to arm portion 76, and a nut 92 cooperates with threaded shank 90 and hub 80 to lock the plunger shank in a desired axial position. Similarly, discharge plunger 86 includes a plunger shank 94 and a threaded mounting shank 96 cooperable with the corresponding threaded bore 82 to provide for axial adjustment of plunger shank 94. A nut 98 cooperates with threaded shank 96 and hub 80 to lock plunger shank 94 in a desired axial position.

When the reciprocating plunger mechanism is in its upper position and the conveyor begins a dwell in its movement, the conveyor and plunger mechanism are in the positions illustrated in FIG. 4. In this respect, input plunger shank 88 is positioned above and in axial alignment with the cartridge casing receiving opening 44 of the conveyor positioned at the input station. Feed chute 16 from the vibratory feeder terminates at a location above opening 44 stopped at the input station and supports a cartridge casing C in a position in which the casing is axially aligned with the plunger shank and opening 44. The cartridge casing is retained in chute 16 by a suitable detent arrangement so that the casing cannot descend by gravity into the cartridge receiving opening in the conveyor. Many suitable detent arrangements can be provided to achieve this result such as, for example, the spring biased ball detent illustrated in FIG. 4 and which includes a ball 100 laterally displaceable into a recess 102 in the conveyor chute against the bias of a coil spring 104. Movement of the ball outwardly of the recess is limited by engagement therebetween, and the ball projects outwardly of the inner surface of the corresponding chute wall sufficiently to restrain downward displacement of casing C by gravity. In the embodiment illustrated, the ball engages the casing at the necked-in lower end thereof to achieve the desired casing holding relationship.

At the time input plunger shank 88 is positioned above the cartridge receiving opening of the conveyor at the input station as described above, output plunger shank 94 is disposed above and in axial alignment with the cartridge casing receiving opening stopped at the output station and which contains a heated cartridge casing C' as illustrated in FIG. 4. It should be noted at this point, that casing C' has been displaced from the end of support rail 70, whereby the casing is free to fall by gravity into guide tube 36 which is aligned with the opening stopped at the output station.

When the conveyor stops and the plungers and cartridge casings C and C' are positioned as illustrated in FIG. 4, shaft 72 descends to move input plunger shank 88 and output plunger shank 94 downwardly towards the corresponding openings 44 of conveyor 19. Accordingly, cartridge casing C is positively displaced into the corresponding opening 44 by plunger shank 88, and the discharge of heated cartridge casing C' is assisted by displacement of output plunger shank 94 into the corresponding conveyor opening. The positions of the input and output plunger shanks following descent of shaft 72 is illustrated in FIG. 4A. Plunger 72 then rises to position the plunger components as illustrated in FIG. 4 in readiness for the next dwell in conveyor movement. The conveyor then advances one step and the preceeding operation of the plunger mechanism is repeated.

It will be appreciated that displacement of cartridge casing C onto the conveyor in the foregoing manner is positive and assures clearance of the casing with respect to feed chute 16 prior to the subsequent movement of the conveyor. At the same time, it will be appreciated that descent of output plunger shank 94 into engagement with heated cartridge casing C' assists movement thereof out of the conveyor opening by gravity and assures clearance of the casing with respect to the conveyor prior to the succeeding movement of the conveyor. In fact, since the heated cartridge casing is in a static state with respect to the conveyor opening when it first leaves support rail 70, it is likely that output plunger 94 will engage and push the cartridge from the conveyor opening before the cartridge has undergone any appreciable movement out of the opening under the influence of gravity. Thus discharge time is reduced with respect to the time required if the effect of gravity alone is relied upon. The positive input and output displacements, which are simultaneous and achieved in the same duration of time and by movement coordinated with indexed rotation of the conveyor, advantageously provide for the indexing rate to be maximized and the input and output functions achieved without production stoppage or damage to cartridge casings resulting from failure to completely seat a cartridge at the input station or completely discharge a cartridge at the output station prior to the subsequent stepping movement of the conveyor.

While it is preferred as disclosed herein that the input and output plungers are mounted on and actuated by an auxiliary shaft associated with the indexing drive mechanism, it will be appreciated that the plunger shafts could be otherwise supported and simultaneously actuated during conveyor dwell. The arrangement disclosed is preferred in that movement of the actuating shaft for the plunger is coordinated with indexing movement of the conveyor through a common drive and transmission mechanism to assure against interference between the conveyor and plunger components during operation of the apparatus. Moreover, it will be appreciated that the input and output plunger components can be supported on arm 74 other than by the arrangement illustrated, and that arm structures other than that illustrated herein can be devised to support the plunger components. In this respect, arm 74 has a horizontal lower end extending transverse to the axis of shaft 72, whereby input plunger shank 88 is axially shorter than output plunger shank 94 to provide for the plungers to achieve their corresponding cartridge displacing operations. The same function can be achieved, for example, by an arm extending at an angle with respect to horizontal and inclining downwardly and to the right as viewed in FIG. 4, whereby the input and output plungers could be of the same axial length and could be used interchangeably to facilitate replacement thereof.

Many embodiments of the present invention can be made and many changes can be made in the embodiments herein illustrated and described without departing from the principles of the present invention. Accordingly, it is to be distinctly understood that the foregoing descriptive matter is to be interpreted merely as illustrative of the present invention and not as a limitation.

What is claimed is:

1. Apparatus for inductively heating metal workpieces comprising, a workpiece conveyor rotatable step-by-step about an axis and relative to an input station, a heating station and an output station at sequential locations about said conveyor axis, said conveyor including a plurality of workpiece receiving openings therethrough circumferentially spaced apart about said conveyor axis and having axes parallel thereto, said heating station including inductor means supported relative to said conveyor for movement of the conveyor to convey workpieces through said heating station in magnetically coupled relationship with respect to said inductor means, means to retain workpieces in said openings during movement of said conveyor from said input station through said heating station, input and output plunger means at the corresponding one of said input and output stations and supported for reciprocating movement along corresponding axes parallel to said conveyor axis, said input and output stations being relatively positioned for one of said openings to be positioned in axial alignment with said input plunger means at said input station when another of said openings is positioned in axial alignment with said output plunger means at said output station, means to releaseably support a workpiece at said input station in axial alignment with said input plunger means and between said input plunger means and said conveyor, and means operable during a dwell in movement of said conveyor to simultaneously reciprocate said input and output plunger means toward and away from said conveyor means to feed a workpiece into said one opening from said workpiece support means and discharge a heated workpiece from said another opening.

2. The apparatus according to claim 1, including quenching liquid container means for receiving heated workpieces discharged from said output station, and means to guide a workpiece discharged from said another opening into said container means.

3. The apparatus according to claim 1, wherein said means to retain workpieces in said openings includes fixed support surface means transverse to said conveyor axis and positioned to be engaged by the inserted ends of workpieces received in said openings.

4. The apparatus according to claim 3, wherein said support surface is an arcuate ring having a radial width slightly greater than the diameter of said openings, said ring extending circumferentially of said conveyor axis and having a first end underlying said input plunger means at said input station and a second end terminating at a location between an opening in the conveyor axially aligned with said output plunger means and the adjacent opening in said conveyor in the direction from said output station toward said heating station.

5. The apparatus according to claim 1, wherein said heating station extends circumferentially of said conveyor axis a distance sufficient for said inductor means to heat said workpieces to a predetermined temperature.

6. The apparatus according to claim 1, wherein said input and output plunger means includes a reciprocable shaft having an axis parallel to said conveyor axis, an input plunger and an output plunger, said plungers having axes, and means interconnecting said plungers with said shaft and in spaced apart axially parallel relationship for reciprocating movement with said shaft.

7. The apparatus according to claim 6, wherein said input and output plungers are each axially adjustable relative to said interconnecting means.

8. The apparatus according to claim 6, wherein said interconnecting means includes a rigid member on said shaft having a pair of arms extending radially outwardly of the axis of said shaft, means interconnecting said input plunger with one of said arms, and means interconnecting said output plunger with the other of said arms.

9. The apparatus according to claim 8, wherein said means interconnecting said plungers with said arms includes means for axially adjusting each plunger with respect to the corresponding arm.

10. The apparatus according to claim 6, wherein said conveyor axis is vertical and said input and output plungers are supported above said conveyor, and said means to retain workpieces in said openings includes fixed surface means positioned below said conveyor and in alignment with said openings for the inserted ends of workpieces to engage said surface means and slide therealong during rotation of said conveyor.

11. The apparatus according to claim 10, wherein said means interconnecting said input and output plungers with said shaft includes a rigid arm mounted on said shaft and having first and second portions extending radially from said shaft at an angle to one another, said input plunger being mounted on said first portion and said output plunger being mounted on said second portion.

12. The apparatus according to claim 11, wherein the axis of said shaft is laterally offset with respect to said conveyor axis.

13. The apparatus according to claim 12, wherein said input and output plungers are each mounted on the corresponding portion of said arm for axial adjustment relative to said shaft axis.

14. The apparatus according to claim 13, wherein said fixed support surface means is spaced below said conveyor for a lower axial portion of workpieces in said openings to be spaced below said conveyor a predetermined axial extent, and said inductor means being disposed above said conveyor, whereby heating of said lower axial portion of workpieces in said openings is minimized.

15. The apparatus according to claim 14, including means at said output station to guide heated workpieces discharged through said another opening away from said output station.

16. The apparatus according to claim 15, and receptacle means for quenching liquid, said guide means leading said heated workpieces from said another opening to said receptacle means.

* * * * *